UNITED STATES PATENT OFFICE 2,445,064

ALKALI METAL HYDROXIDE LIQUID REAGENT

Archibald John Hall and Frederick Charles Wood, Manchester, England, assignors to Tootal Broadhurst Lee Company Limited, Manchester, England, a British company No Drawing. Original application October 24, 1940, Serial No. 362,694. Divided and this application November 23, 1942, Serial No. 466,670. In Eire and New Zealand October 30, 1939

4 Claims. (Cl. 252—192)

The technical literature and scientific literature abounds in examples of the use of aqueous and/or alcoholic solutions of alkalis for effecting physical or chemical changes (or both) in various products as for example hydrolysis or saponification of fats, proteins, esters, amides, urethanes, or again for effecting changes in which the alkali solution acts as a swelling agent or condensing agent or coagulating agent or dispersing agent or dehydrating agent or polymerizing agent or depolymerizing agent. Again, alkali has been used in merely forming alkali-compounds which may then be further reacted with other substances.

Again alkali has been used as a reagent for absorbing or removing acids or acid vapours from any system.

According to the present invention we have found that aqueous or alcoholic alkali may be replaced by a reagent containing not more than 2% water and consisting substantially of (a) an alkaline substance, (b) an organic liquid which has at least three carbon atoms in the molecule and which is a solvent for (a), and (c) an organic non-solvent or poor solvent for (a) which is miscible with the solution of (a) in (b).

The addition of substantial quantities of methyl or ethyl alcohol lowers the flash point of mixtures of hydrocarbons of boiling point above 100° C. and is disadvantageous in the treatment of wool. There is therefore an advantage if the reagent consists substantially of ingredients (a), (b), (c) i. e. in substantial absence of methyl or ethyl alcohol.

We have further found it advantageous to use a reagent containing an alkaline substance, sufficient of an organic liquid solvent containing at least three carbon atoms in the molecule to dissolve all the alkaline substance and an excess of an organic non-solvent for the alkaline substance.

The term alkaline substance is defined herein as a substance which in presence of water would give hydroxyl ions, and includes alkalis or organic bases or substances producing or capable of producing an alkali or organic base, preferably of stronger basic nature than ammonia.

The preferred alkaline substances are caustic soda or caustic potash or organic bases of suitable strength such as quaternary ammonium, sulphonium or iodonium bases.

The term alkaline substance includes also tertiary amine oxides; hydrazine and its hydrate; alkylates of metal such as sodium butylate and potassium ethylate; sodamide; metal derivatives of organic substances which hydrolyze with water such as the sodio derivatives of acetoacetic ester, acetone, and methyl ethyl ketone; sodium and potassium oxides, peroxides or hydroxides; alkaline substances which are gaseous at normal temperature and pressure may be used. This list is merely illustrative and is not intended to be exhaustive.

The organic solvent (which term includes a single liquid or a mixture of liquids) is chosen with relation to the alkaline substance. Suitable solvents may be found among the aliphatic alcohols especially those containing three to eight carbon atoms, but also oleyl, stearyl, ricinoleyl, or aromatic alcohols such as benzyl alcohol or phenyl ethyl alcohol, hydroaromatic alcohols such as cyclohexanol, amino alcohols or glycol ethers such as the methyl, ethyl and butyl ethers of ethylene glycol, acetone, ethylacetoacetate, aniline, ethyl acetate or amyl acetate.

The non-solvent or poor solvent (which term includes a single liquid or a mixture of liquids) is preferably a hydrocarbon such as a petroleum distillate, e. g. paraffin, hexane, white spirit (a petroleum distillate of boiling range 150–260° C. and sp. g. 0.81) or petrol or chlorinated hydrocarbon or an aromatic or hydroaromatic hydrocarbon such as toluene or tetrahydronaphthalene, but other non-solvents and poor solvents such as pyridine, ketones, ethers or esters or higher alcohols may be used.

The flash point of the mixture of solvent and non-solvent is preferably above 60° F. Abel test.

Reference is made to our co-pending application No. 362,694, filed October 24, 1940 from which this application is divided and which is now Patent No. 2,367,273, for a more detailed description of the composite reagent and this co-pending application also describes the treatment of wool with preferred reagents.

Materials which may be treated with the reagents include esters, ethers, fats, hydroxylic compounds, and may if desired be in the form of moulded articles, sheets, tubes, fibres, yarns and fabrics made from these and the treatment may be carried out so as to produce a partial modification or complete modification of the particular substance or material which is being subjected to the treatment.

The material to be treated may contain a non-reactive part in addition to a reactive or partially reactive part or both, and hence a partial or complete separation of component parts may be facilitated.

In the case of a partial conversion of materials to other materials either the unchanged portion or the portion which has undergone conversion may if desired be simultaneously or afterwards removed by well known processes.

The rate and extent of physical or chemical modification of the material being treated may be altered by varying its content of moisture or other substance such as alcohol added to the material or alternatively by adding limited amounts of moisture or other substance to the reagent. Or again, both material to be treated and reagent may contain moisture or other substance.

*Example 1*

Normal butyl alcohol was shaken in a machine with solid caustic soda till a solution-emulsion was obtained. This was poured off from the solid caustic soda and analysed.

The solution-emulsion was found to contain 15.4 gms. NaOH in 100 ccs. (88 gms.).

To 1½ litres of this solution-emulsion 2.25 litres of normal butyl alcohol was added giving 3.75 litres of a clear solution of caustic soda in butyl alcohol containing about 64 gms. NaOH per litre.

One litre of this solution was diluted to 10 litres with "white spirit." A clear solution was obtained thus containing 6.4 gms. NaOH per litre.

This solution has the interesting property of giving a fine dispersion containing caustic soda when warmed, which redissolves on cooling. This property may be utilised in treating materials with the reagent.

The reagent may, for example, be used for the following purposes:

(1) The reduction of the acyl content of cellulose esters such as cellulose acetates, propionates, etc. or hydrolysis of other derivatives of cellulose, e. g. cellulose fibres, which have been esterified with p-toluene sulphonic chloride.

(2) The production of polyvinyl alcohol from polyvinyl acetate.

(3) The saponification of glyceryl esters, e. g. mutton fat, and other fatty or greasy substances.

(4) The transformation of ethyl acetate into ethyl acetoacetate.

(5) The cleaning of greasy metal and other materials, also the dry cleaning of textiles.

(6) The removal of carbon dioxide from gases by bubbling through the reagent.

(7) The treatment of cotton, regenerated cellulose, or silk fibres to effect a superficial swelling. This makes the fibres superficially reactive after which they may be subjected to other treatments.

This list is not exhaustive.

The following examples illustrate some of these aspects of the invention:

*Example 2*

Cellulose acetate satin fabric was steeped for 10 minutes at 16° C. in a liquor prepared by adding 90 ccs. of white spirit to 10 ccs. of n-butyl alcohol containing 0.6 gm. of caustic soda. The fabric was then centrifuged, acidified in dilute hydrochloric acid, thoroughly washed with water, and dried. The resulting fabric was characterised by dyeing very evenly with Chlorazol Sky Blue FF and other cotton dyes to which it was previously immune, and possessed a softer handle than if the saponification has been effected with aqueous alkali.

*Example 3*

Cellulose acetate woven fabric was printed to give a spot pattern with a resist paste consisting of tartaric acid thickened with British gum and starch, and dried. The fabric was then treated as described in Example 2 whereby it became dyed only in the non-printed part to give a white spot pattern on a blue or other coloured ground.

*Example 4*

A cotton-viscose rayon mixed fabric was immersed in a solution containing 3 gms. NaOH, 50 ccs. butyl alcohol and 50 ccs. white spirit for 10 minutes.

It was then squeezed between rollers and immersed in a 10% solution of chlormethoxy sulphonic chloride ($Cl.CH_2.O.SO_2Cl$) in white spirit at 30° C. for half an hour.

The product was well washed and dried and was found to contain combined formaldehyde, showing that a cellulose methylene ether had been produced.

*Example 5*

One part of damp (not wet) plain bleached cotton fabric was immersed for one hour at room temperature in a solution consisting of 0.2 part of caustic soda, 8 parts of butyl alcohol, and 92 parts of white spirit, and then mangled and immersed for five minutes at room temperature in a solution consisting of 5 parts of sulphuryl chloride in 100 parts of white spirit. The fabric was then mangled and thoroughly washed with dilute aqueous ammonia, then washed with water, and dried. The resulting fabric had a more sheer appearance and was stiffer as though it had been partly parchmentised.

*Example 6*

5 gms. of damp (not wet) plain bleached cotton fabric was steeped for one hour at room temperature in a solution consisting of 1 gm. of caustic soda, 40 cc. of butyl alcohol, and 460 cc. of white spirit, and then mangled and immersed for one hour at room temperature in a 3% solution of carbon bisulphide in white spirit. The fabric was then mangled and plunged into 10% aqueous sulphuric acid, followed by thorough washing and drying. The resulting fabric had increased stiffness and dyed more deeply with Chlorazol Sky Blue FF, as would be expected if the surface of each cotton fibre consisted of cellulose regenerated from cellulose xanthate.

We claim:

1. A liquid reagent having a flash point above 60° F. by the Abel test and consisting essentially of a solution of an inorganic caustic alkali in a liquid monohydric aliphatic alcohol containing three to eight carbon atoms in the molecule and a petroleum distillate of boiling range 150–200 degrees C. whose volume is in excess of the volume of alcohol, the amount of caustic alkali being from 0.2 to 3 grams to 100 cc. of the mixed alcohol and distillate.

2. A liquid reagent having a flash point of above 60° F. by the Abel test and consisting of caustic soda, a minor proportion by volume of normal butyl alcohol and a major proportion by volume of a petroleum distillate of boiling range 150–260 degrees C., said distillate having the alcohol dissolved therein, the amount of caustic soda being from 0.2 to 3 grams to 100 cc. of the mixed alcohol and distillate.

3. A liquid reagent consisting essentially of alkali metal hydroxide dissolved in a liquid monohydric alcohol containing three to eight carbon atoms in the molecule, and a petroleum distillate of boiling range 150–260 degrees C., the volume of said distillate being from 1 to 11½ times the volume of the said alcohol, the amount of alkali metal hydroxide being from 0.2 to 3 grams to 100 cc. of the mixed alcohol and distillate.

4. A liquid reagent consisting of a solution of alkali metal hydroxide in a liquid mixture of a minor proportion by volume of normal butyl alcohol and a major portion by volume of a petroleum distillate of boiling range 150–260 degrees C., the amount of alkali metal hydroxide being substantially 6.4 grams per liter of the mixed alcohol and distillate.

ARCHIBALD JOHN HALL.
FREDERICK CHARLES WOOD.

REFERENCES CITED

The following references are of record in the file of this patent:

UNITED STATES PATENTS

| Number | Name | Date |
|---|---|---|
| 649,454 | Hopkinson | May 15, 1900 |
| 974,749 | Caulfield | Nov. 1, 1910 |
| 1,194,013 | Handy et al. | Aug. 8, 1916 |
| 1,538,650 | Peacock et al. | May 19, 1925 |
| 1,791,521 | Bjerregaard | Feb. 10, 1931 |
| 1,924,185 | Gollmar | Aug. 29, 1933 |
| 1,962,139 | Dreyfus et al. | June 12, 1934 |
| 2,059,075 | Yabroff et al. | Oct. 27, 1936 |
| 2,091,970 | Dreyfus | Sept. 7, 1937 |
| 2,113,942 | Jones | Apr. 12, 1938 |
| 2,185,332 | Crampton | Jan. 2, 1940 |
| 2,189,788 | Freeman | Feb. 13, 1940 |
| 2,236,617 | Brandt | Apr. 1, 1941 |
| 2,270,491 | Yabroff et al. | Jan. 20, 1942 |

OTHER REFERENCES

Redemann et al.: Article in Ind. Eng. Chem.; Anal. Ed., vol. 9, pages 521–2 (1937).